United States Patent [19]

Wijffels et al.

[11] Patent Number: 4,568,523

[45] Date of Patent: Feb. 4, 1986

[54] MOVING CATALYST BED REACTOR

[75] Inventors: Joannes B. Wijffels; Gerrit-Jan Pronk; Arie P. den Hartog, all of The Hague, Netherlands

[73] Assignee: Shell Oil Company, Houston, Tex.

[21] Appl. No.: 654,578

[22] Filed: Sep. 26, 1984

[30] Foreign Application Priority Data

Oct. 7, 1983 [GB] United Kingdom ............... 8326856

[51] Int. Cl.⁴ .................... B01J 8/12; C10G 35/12
[52] U.S. Cl. .................... 422/191; 422/192; 422/194; 422/195; 422/216; 422/220; 422/311
[58] Field of Search ............ 422/191, 194, 195, 213, 422/216, 220, 311, 189, 190, 192

[56] References Cited

U.S. PATENT DOCUMENTS 2,593,495  4/1952  Shimp .................. 422/216
4,446,112  5/1984  Hartog ................. 422/216

Primary Examiner—Frank Sever

[57] ABSTRACT

Moving catalyst bed reactor comprising a normally vertically extending cylindrical vessel having separate inlets for reactant and catalyst at the upper part of the vessel, an intermediate catalyst bed supporting means and a bottom catalyst bed supporting means inside the vessel and separate outlets for reactor effluent and catalyst. At least the intermediate catalyst bed supporting means consists of a plurality of interconnected downwardly converging frustoconical surfaces having their lower ends connected to spaced apart vertical outlet channels having circumferential walls provided with substantially circumferential screen sections for withdrawing reactor effluent from catalyst, the vertical outlet channels 12 having their axes arranged substantially uniformly distributed in a circular pattern.

5 Claims, 3 Drawing Figures

MOVING CATALYST BED REACTOR

BACKGROUND OF THE INVENTION

The present invention relates to a moving catalyst bed reactor for the catalytic treatment of hydrocarbons, in particular catalytic desulphurization and demetallization of petroleum residues.

The invention relates more in particular to a moving catalyst bed reactor comprising a normally vertically extending cylindrical vessel having separate inlets for reactant and catalyst at the upper part of the vessel. The vessel contains a catalyst bed supporting means in the shape of a downwardly converging conical surface, the lower end thereof being connected to a vertical outlet channel with a circumferential wall for the combined passage of catalyst and separation of reactor effluent. The circumferential wall is provided with a circular screen section for withdrawing reactor effluent from catalyst, said vessel further having separate outlets for reactor effluent and catalyst downstream of said screen section.

Moving bed reactors of a design as identified above are well known. An example thereof has been described, e.g. in U.S. Pat. No. 3,883,312. According to this patent both, the used catalyst particles and the reactor effluent, are removed from a moving catalyst bed reactor through the same withdrawal conduit. The reactor effluent exits the conduit through openings of a circumferential screen section in its wall.

In recent years there is a tendency to carry out processes of this kind on a larger scale, which has resulted in problems in the design of reactors when they are scaled-up to large capacities. One such problem is the resulting size of the catalyst bed and the cross-sectional area of the catalyst/reactor effluent outlet channel required to allow catalyst to pass through the outlet channel at an acceptable rate. Increase of the cross-sectional area of the catalyst/reactor outlet channel however, means impairment of the catalyst/reactor effluent separation efficiency in that separation of reactor effluent from central parts of the bed becomes more and more difficult.

U.S. Pat. No. 4,357,304 relates to an improved moving catalyst bed reactor of a design in which the above scaling-up difficulty and the increase in the size of the outlet channel has been overcome. According to this patent the catalyst/reactor effluent outlet channel is provided with further screen sections within its wall for withdrawal of reactor effluent from catalyst.

A further problem associated with upscaling of catalytic treatment processes resides in the constructional design of large capacity reactors. Increase of the diameter of the catalyst/reactor effluent outlet channel, and thus increase of the circumferential screen section in the wall of the channel complicates manufacture and installation of the screen section. Another consequence of process upscaling is the fact that the screen sections in the outlet channels should be able to withstand ever increasing loads both in horizontal and in vertical direction.

In co-pending application Ser. No. 390,452, assigned to the same assignee as this application, a moving catalyst bed reactor is described, in which reactor the circumferential screen section of a catalyst/reactor effluent outlet channel is composed of a plurality of separate screen segments which are preferably supported in lateral outward direction and in vertical direction by special supporting elements. The separate screen segments enable a simple fabrication and installation of the complete screen section in a reactor. According to the above-mentioned publications, the catalyst/reactor effluent outlet channels, of especially large reactor vessels, may be provided with further screen sections within the outlet channels for promoting reactor effluent separation from the catalyst particles passing through said channels.

Especially in very large reactors, supporting of the screen sections in the catalyst/reactor effluent outlet channels may form a severe constructional problem, in particular if the channels are to be provided with extra internal screen sections within the outlet channels to meet the required separation efficiency.

If a reactor is provided with several superimposed catalyst beds, for example required for allowing intermediate cooling of reactor effluent, requirements are set as to the redistribution of fluid from a catalyst bed over a next lower catalyst bed. In particular, if large diameter reactors are to be applied, it is very important to have a proper redistribution of fluid over the catalyst bed to keep the catalyst bed height within acceptable limits. Increase of the bed height means increase of the length of the reactor vessel and thus a considerable rise in manufacturing costs in particular if the vessel is a so-called pressure vessel, as in normal in catalytic treatment processes.

As already mentioned in the above, high capacity operation requires in general the application of further screen sections for reactor effluent withdrawal in the known moving catalyst bed reactors. For supporting such further internal screen sections special supporting constructions will be necessary for transferring the load on these screen sections to the wall of the outlet channel in which these sections are arranged.

SUMMARY OF THE INVENTION

The object of the present invention is to further improve a moving bed reactor of the type specified above in order to optimize the possibilities for fluid redistribution in the reactor and to enable the application of simpler and less heavy supporting equipment for the screen sections.

The moving catalyst bed reactor of the type specified above, which comprises a normally vertically extending cylindrical vessel having separate inlets for reactant and catalyst at the upper part of the vessel. An intermediate catalyst bed supporting means and a bottom catalyst bed supporting means are mounted inside the vessel and separate outlets for reactor effluent and catalyst are provided. At least the intermediate catalyst bed supporting means consists of a plurality of interconnected downwardly converging frustoconical surfaces, having their lower ends connected to spaced apart vertical outlet channels. The outlet channels have their circumferential walls provided with substantially circumferential screen sections for withdrawing reactor effluent from catalyst. The vertical outlet channels have their axes arranged substantially uniformly distributed in a circular pattern.

By the above arrangement of downwardly converging conical surfaces with accompanying vertical outlet channels, catalyst from said outlet channels can be more regularly distributed over the next lower catalyst bed supporting means than in a system using a single annular outlet channel. A more regular distribution of catalyst particles over the cross section of the vessel means that the height of the catalyst bed and therefore the total height of the vessel can be kept smaller than with the known configurations of outlet channels. The total number of outlet channels which should be chosen depends in first instance on the total screen area required for a desired throughput of reactor effluent. A suitable number of outlet channels is in the range of 3 through 8.

By the above arrangement of vertical outlet channels according to the invention, the outlet channels may be fully supported by external supporting means without the necessity of internal supporting means passing through the outlet channels.

The proposed design further enables redistribution of reactor effluent passed through the screen openings in the outlet channels over the total cross section of the vessel prior to introducing the fluid into a next lower catalyst bed. This distribution of the reactor effluent enables a further optimization of the minimum required catalyst bed height.

In a preferred embodiment of the invention, the parts of the frustoconical surfaces facing one another are at their upper ends detachably connected to an upwardly converging conical surface coaxially arranged with respect to the vessel. By this arrangement, the space between the vertical outlet channels is easily accessible for maintenance and inspection of the inner parts of the screen segments in said channels. The top angle of the upwardly converging conical surfaces and the top angle of the adjacent frustoconical surfaces are preferably substantially equal to one another and are suitably from about 30° to 90° inclusive to allow a smooth entry of catalyst particles into the vertical outlet channels.

For absorbing the load on the upwardly converging conical surface this conical surface is preferably supported by separate supporting means, for example, a tubular element which is in its turn supported by the supporting means of the vertical outlet channels.

BRIEF DESCRIPTION OF THE DRAWINGS

The invention will now further be described with reference to the accompanying drawings, wherein.

DESCRIPTION OF PREFERRED EMBODIMENTS

Figure 1:
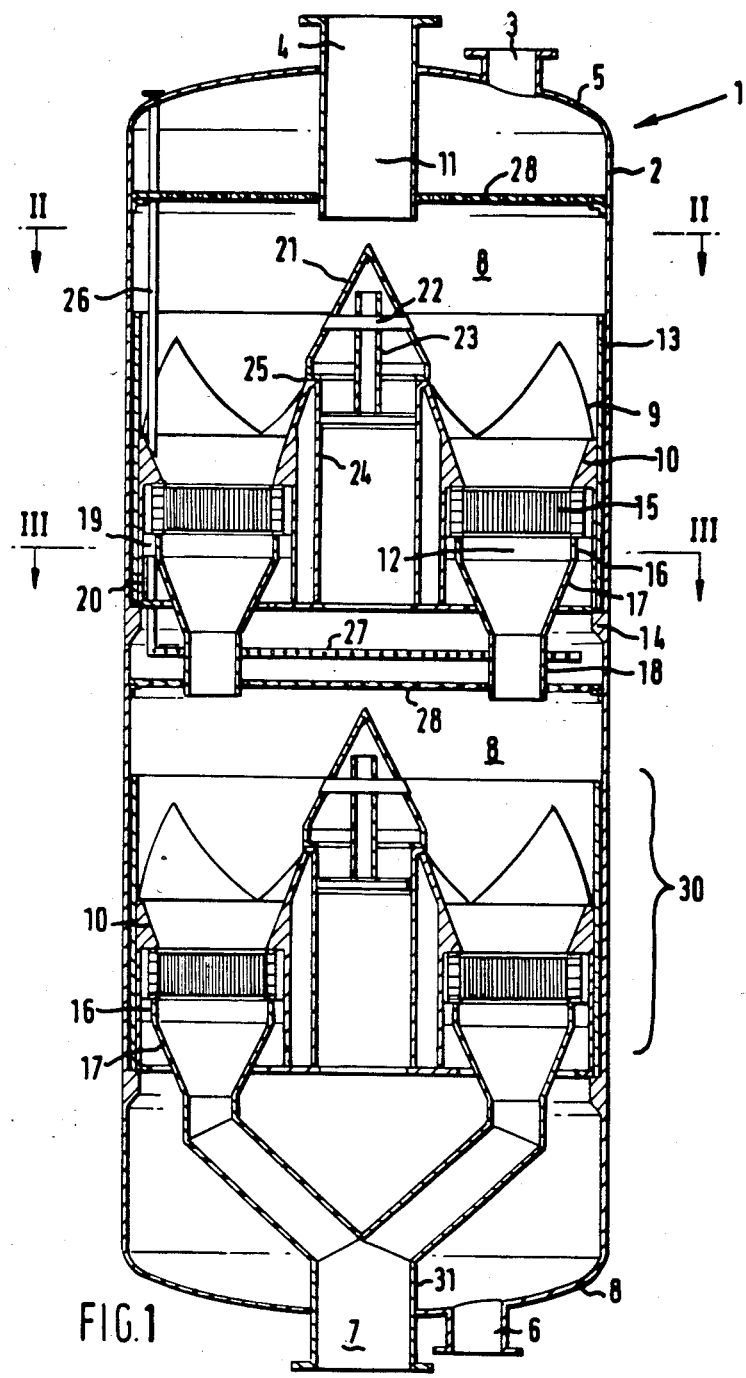
FIG. 1 is a schematic sectional view showing a reactor vessel provided with catalyst/reactor effluent outlet channels according to the invention.
Figure 2:
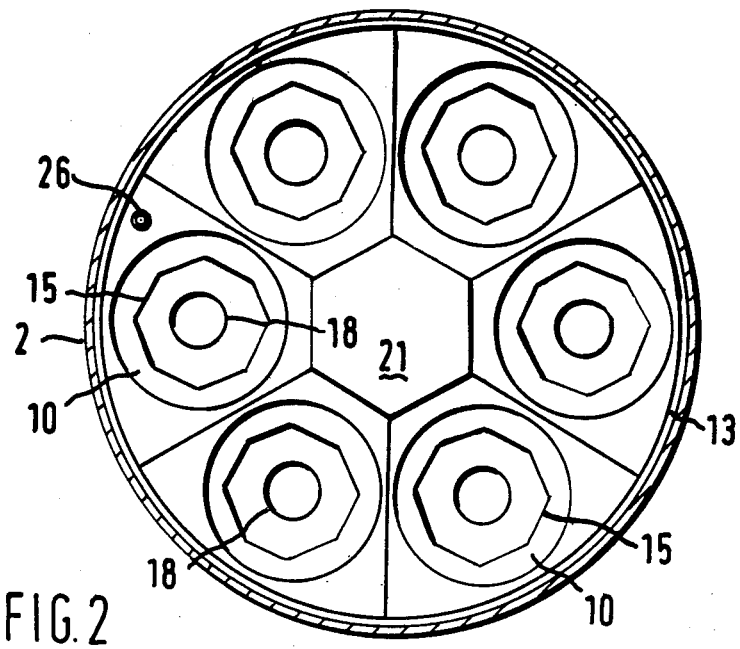
FIG. 2 schematically shows a cross section taken along line II—II of FIG. 1.
Figure 3:
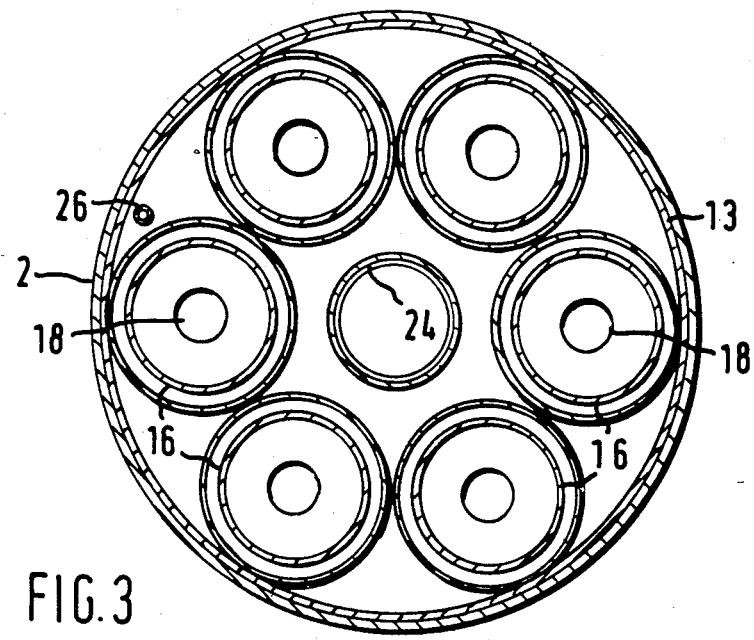
FIG. 3 schematically shows a cross section taken along line III—III of FIG. 1.

FIG. 1 shows a vertical section of a normally vertically extending substantially cylindrical reactor vessel 1 having a side wall 2. The reactor vessel 1 is provided with separate inlets 3 and 4 for reactant and catalyst, respectively, in the top part 5 of the vessel and separate outlets 6 and 8 for reactor effluent and catalyst, respectively, in the bottom part 8 of the vessel. The reactor vessel 1 is internally provided with a plurality of superposed catalyst bed supporting means, dividing the interior of the vessel into a plurality of reactor zones 8. The catalyst bed supporting means may be distinguished into intermediate supporting means and bottom supporting means.

The intermediate bed supporting means, generally indicated with reference numeral 9, consists of a plurality of downwardly converging frustoconical surfaces 10 having their axes arranged in a circular pattern substantially coaxially with the main axis 11 of the reactor vessel 1. The converging conical surfaces 10 each terminate at their lower ends in a vertical outlet channel 12 for the passage of catalyst and reactor effluent. In this example the angle with the vertical axis of the conical surfaces 10 is about 20 degrees. The conical surfaces are connected to an upwardly extending cylindrical structure 13, which in its turn is supported by supports 14 at the inner surface of the reactor side wall 2.

Each vertical outlet channel 12 is provided with a ring-shaped screen 15 in the channel wall for separating reactor effluent, which passes through the screen openings, from the catalyst. The vertical outlet channels 12 each comprise comprise a substantially cylindrical upper part 16 in which the screens are positioned, a downwardly converging intermediate aprt 17 and a substantially cylindrical lower part 18. The downwardly converging intermediate parts 17 are intended to increase the back pressure in the channels 12 during operation and thereby promoting the separation of reactor effluent from the catalyst via the screens 15. The half top angle of the intermediate parts 17 should preferably be chosen in the range from 15–45 degrees to promote mass flow of catalyst through the outlet channels 11. For absorbing the vertical load on the screens 15 in the vertical outlet channels the screens are preferably supported via baffles 19 by cylindrical skirts 20 secured to the main support structure 13.

The parts of the conical surfaces 10, which face one another are at their upper end connected to a substantially centrally arranged upwardly converging cone 21. The top angle of this cone 21 is preferably chosen substantially equal to the top angle of the conical surfaces 10 to provide a smooth passage for catalyst from an upper part of the catalyst bed into the vertical outlet channels 12. The cone 21 is detachably mounted on the conical surfaces 10 via a pin/slot arrangement 22 passing through a tubular element 23. The cone 21 is supported by the main support structure 13 via a tubular element 24 and a further skirt 25.

The vessel 1 is further provided with a quench fluid supply pipe 26 extending from the top of the vessel to a quench fluid injection pipe 27 connected therewith, and with liquid distributor trays 28 above the catalyst beds supported on the conical surfaces 10.

Although only one intermediate catalyst bed supporting means formed by the conical surfaces 10, is shown in the drawings, it should be understood that a plurality of such intermediate superposed catalyst bed supporting means may be used.

In the embodiment of the vessel shown in the Figures, the bottom catalyst bed supporting means, generally indicated with reference numeral 30, are formed in the same manner as the intermediate catalyst bed supporting means 9. The various components of the supporting means 30 have therefore been indicated with the same reference numerals as the parts of the supporting means 9. The vertical outlet channels 12 of the bottom catalyst bed supporting means 30 terminate at their lower ends in a single catalyst withdrawal pipe 31 passing through an opening in the bottom of the vessel thereby forming the catalyst outlet 7.

It will be understood that instead of using a single catalyst withdrawal pipe, it is also possible to have the lower vertical outlet channels extended through openings in the bottom of the vessel. In this case the catalyst outlet is formed by the lower ends of the vertical outlet channels.

In the shown reactor design the intermdiate catalyst bed supporting means and the bottom catalyst bed supporting means have been constructed according to the invention. As already mentioned above, important advantages of the configuration of supporting means according to the invention are the redistribution of reactor effluent over the cross section of the vessel and the substantially uniform distribution of catalyst over a next lower catalyst bed. Since these advantages do not require the bottom part of the vessel, the bottom catalyst bed supporting means may be formed differently from the intermediate catalyst bed supporting means, without departing from the invention.

The screens 15 in the vertical outlet channels 12 may be of any suitable configuration such as, for example, described in patent application Ser. No. 390,452 filed June 21, 1982.

It should be noted that the present invention is not restricted to the embodiment described above by way of example. In practice, the selection of the number of vertical outlet channels is dependent on the process requirements and in particular on the capacities wanted and the constructional consequences thereof.

What is claimed is:

1. A moving catalyst bed reactor having a vertical cylindrical vessel provided with separate inlets for reactant and catalyst in the upper part of the vessel, an intermediate catalyst bed supporting means and a bottom catalyst bed supporting means and separate outlets for the reactant effluent and catalyst in the bottom part of the vessel, wherein the intermediate catalyst supporting means comprises:
    a plurality downwardly converging frustoconical surfaces arranged in a circular pattern;
    a cyclindrical member, said cylindrical member being mounted within the vertical cylindrical vessel and surrounding said frustoconical surfaces, each of said frustoconical surfaces being connected to and fully supported by the cylindrical member;
    a plurality of vertical cylindrical outlet channels arranged in a circular pattern, a portion of the circumferential wall of each outlet channel being formed by a circumferential screen for withdrawing reactant effluent from the catalyst, the lower ends of the frustroconical surfaces being connected to said cylindrical member; and
    a plurality of cylindrical support means, one of said support means being disposed to surround and support each of said cylindrical outlet channels, said cylindrical support means being connected to said cylindrical member whereby said reactant effluent can be re-distributed over the total cross section of the reactor vessel.

2. A moving catalyst bed reactor as claimed in claim 1, wherein the number of vertical outlet channels of each intermediate catalyst bed supporting means is chosen in the range of 3 through 8, inclusive.

3. A moving catalyst bed reactor as claimed in either claim 1 or 2, wherein the upper ends of the adjacent surfaces of the frustoconical surfaces facing one another are detachable connected to an upwardly converging conical surface substantially coaxially arranged with respect to the reactor vessel.

4. A moving catalyst bed reactor as claimed in claim 3, wherein the top angle of the upwardly converging conical surface and the top angle of the adjacent frustoconical surfaces are substantially equal to one another.

5. A moving catalyst bed reactor as claimed in claim 4, wherein the top angle of the upwardly converging conical surface and the top angle of the adjacent frustoconical surfaces are each in the range from about 30° through 90°, inclusive.

* * * * *